United States Patent Office 3,458,323
Patented July 29, 1969

3,458,323
CULINARY COMPOSITION CONTAINING
ALKYL PHOSPHORYL HALIDES
James E. Thompson, Springfield Township, Hamilton County, Ohio, assignor to The Procter & Gamble Company, Cincinnati, Ohio, a corporation of Ohio
No Drawing. Filed June 28, 1965, Ser. No. 467,772
Int. Cl. A23d 5/00; A21d 13/08
U.S. Cl. 99—118                                          3 Claims

ABSTRACT OF THE DISCLOSURE

A bakery composition such as a glyceride shortening or a cake batter containing an alkyl phosphoryl halide, e.g., octadecyl phosphoryl dichloride, to improve air incorporation and foam stability.

---

This invention relates to new compositions of edible matter and, more particularly, to novel compositions containing alkyl phosphoryl halide additives for the preparation of bakery products such as cakes, breads, pastry doughs, sweet breads, and the like products prepared from emulsions comprising water, fats, proteins and/or carbohydrates.

The volume, texture, and eating qualities of many bakery products are dependent upon the interaction of various ingredients during the mixing operation in which a dough, batter, or other emulsion is formed and the stabilization of the bakery product during subsequent baking and/or storage. Many attempts have been made to improve the emulsion characteristics of bakery products by incorporating therein small amounts of various edible additives which are able to appreciably affect the colloidal properties of the proteinaceous, and/or amylaceous, and/or oleaginous bakery constituents. Although a number of the conventional additives are useful emulsifiers in bakery products, these emulsifiers do not provide the air incorporation and foam stability desired in many bakery products.

It is, therefore, a primary object of this invention to improve the air incorporation and foam stability properties of bakery products prepared from batters, doughs, and other bakery emulsions.

It is a further object to provide means for the preparation of cakes, breads, pastry doughs, sweet breads, and the like bakery products having improved volume, texture and eating qualities.

Other objects and advantages will be apparent from the disclosure herein.

In accordance with the present invention it has been discovered that improved air incorporation and foam stability in bakery products can be obtained by introducing into the bakery product or a component thereof, a small but effective amount of an alkyl phosphoryl halide containing from 1 to 2 alkyl groups having from about 12 to about 22 carbon atoms and from 1 to 2 halide atoms. These additives are used in amounts of from about 0.01% to about 10%, by weight of the bakery product, and preferably from about 0.1% to about 4%, by weight of the shortening in the bakery product.

The alkyl phosphoryl halides used as additives in the bakery products of this invention are esters of orthophosphoric acid, metaphosphoric acid, pyrophosphoric acid, phosphorus acid and hypophosphorus acid. They can be prepared by well-known reactions of phosphoryl halides, for example phosphoryl chloride and phosphoryl bromide, with "long chain" or "higher" fatty alcohols having from about 12 to about 22 carbon atoms, for example, lauryl, myristyl, cetyl, stearyl, arachidyl and behenyl alcohols. A preferred method of preparation of the alkyl phosphoryl halides is described in detail hereinafter.

Although it is not desired to be bound by theory, it is believed that the mechanism by which the alkyl phosphoryl halide additives of this invention act in cake batters and other bakery emulsions is by direct chemical reaction with other batter constituents, such as protein and starch, which in turn leads to the effective stabilization of the batter, particularly at high temperatures such as ordinary baking temperatures. However, irrespective of the mechanism by which these compounds function in the batter, it has been found that the addition of about 0.01% to about 10%, by weight of the bakery product, and preferably about 0.1% to about 4%, by weight of the shortening, of one or more of these compounds to the batter system increases the air incorporating properties of conventional shortenings and stabilizes the cake against shrinkage during baking and subsequent cooling of the cake. These stabilization properties give rise to improved cakes of high volume and fine texture.

The alkyl phosphoryl halide additives of this invention can be incorporated into the bakery product by direct addition to a batter, dough, or shortening-containing emulsion, or by admixture with a dry ingredient in the form of a pre-mix for said batter, dough, or shortening-containing emulsion. In the practice of this invention it has been found that especially desirable results are obtained by admixing the alkyl phosphoryl halide with either an amylaceous, proteinaceous, or oleaginous substance, such as flour or shortening, before employing it in a batter, dough, or shortening-containing emulsion. Very good results are also obtained by preadmixture of the alkyl phosphoryl halide with a complete dry prepared culinary mix such as a prepared cake mix comprising shortening, sugar, and flour. Examples of such dry cake mixes are chocolate, yellow, spice, white and other such cakes mixes comprising, for example, about 10% to about 25% shortening, about 30% to about 50% sugar, and about 30% to about 50% flour.

The amylaceous substances which can be employed for this purpose can be a part or all of the flour normally employed in the preparation of bakery products such as cakes, breads, pastry doughs, sweet breads and the like. All types of flours can be used, for example: cake, bread, and pastry flours; bleached and unbleached flours; high or low protein-content flours; flours having high or low phytic acid content; and various other types of flours derived from any of the known grains and cereal sources, such as wheat, corn, rice, barley, rye, and the like. For ordinary cake mix purposes, ordinary bleached cake flour is preferred. Starches derived from these common cereal sources or potato starches, and the like, can also be used as part of the amylaceous substance.

The proteinaceous substances which can be employed in the practice of this invention include, by way of example: simple proteins such as the albumins, including egg albumin, the globulins, including whey globulins, the gentelins such as from wheat and other cereals, the prolamines such as zein and gliadin, the albuminoids, such as gelatin, and protamines, such as alginine, as well as conjugated proteins, such as phosphoproteins, including casein, and the lecithoproteins, including lecithin. The preferred proteins are derived from flour, milk solids, and egg solids.

The oleaginous substances which can be employed in the practice of this invention can be plastic, semi-fluid, or liquid glyceride shortenings derived from animal, vegetable, or marine fats and oils. These glycerides can have saturated or unsaturated long-chain fatty acyl groups having from about 12 to about 22 carbon atoms such as lauroyl. palmitoyl, stearoyl, oleyoyl, linoleoyl, linolenoyl, behenoyl, and the like, and are generally obtained from edible fats and oils such as cottonseed, soybean, corn, peanut, coconut, rapeseed, crambe seed, sunflower, sesame seed, safflower, palm, palm kernel, whale, menhaden, sardine and herring oils as well as lard and tallow. The glycerides can also contain, in part, one or two short-chain fatty acid groups derived from acids such as acetic and propionic acids. These shortenings can be natural oils and fats derived from single sources or they can be mixtures of various oils and fats. These oils and fats can be crystallized or otherwise processed by any of the known methods of shortening preparation and they can be subjected to various interesterification and alcoholysis reactions, for example, such as to produce randomly or directed rearranged lard, coconut, palm, or cottonseed oils or such as to produce cottonseed or soybean oils interesterified with mono- and diglycerides, glycols, glycerols, and sugar alcohols. These fats and oils are preferably refined, bleached, and deodorized to make them most suitable for edible purposes.

The shortening can contain small amounts, for example, up to about 10%, and preferably at least .01%, by weight, of conventional emulsifiers such as, for example, the mono- and diglycerides; lactylated long-chain fatty acid glycerol and glycol esters; sorbitan and polyoxyethylene sorbitan esters of long-chain fatty acids; long-chain fatty acid esters of sugars and sugar alcohols such as sucrose and sorbital; phosphoric and sulfuric acid esters such as dodecyl glyceryl ether sulfate, monostearin phosphate and sodium alkyl sulfate; various higher fatty acid esters of citric and tartaric acids such as citric acid monoglyceride, stearyl monoglyceridyl citrate, and diacetyl tartaric acid ester of monostearin; and free fatty acids such as stearic acid. The fatty acid portion of these emulsifiers preferably ranges from $C_{14}$ to $C_{22}$.

The alkyl phosphoryl halide can be incorporated in the shortening by any suitable means whereby a substantially homogeneous mixture is formed. When it is desired to prepare a liquid shortening composition (as distinguished from a plastic or solid shortening) which contains the alkyl phosphoryl halides, it is preferable to incorporate therein, additionally, an alpha-phase crystal-tending emulsifier in amounts of from about 0.5% to about 15%, by weight of the shortening. The alpha-phase crystal-tending emulsifier cooperates with the alkyl phosphoryl halide in the air incorporation performance of cake batters.

The alpha-phase crystal-tending emulsifiers used in this invention are to be distinguished from fatty materials having predominantly beta or beta-prime crystal-tending phases. These types of crystalline structures can be identified by their X-ray diffraction patterns and are described in an article by E. S. Lutton in the Journal of the American Chemical Society, vol. 67, page 524 (1945), and in Mitchell, U.S. Patents 2,521,241-2, granted September 5, 1950. The alpha crystalline form is the least stable, least dense, and lowest melting of these crystalline forms. The alpha-phase crystal-tending emulsifiers used in this invention are both lipophilic and hydrophilic and contain in the molecule at least one higher fatty acid group having from about 12 to about 22 carbon atoms and at least one free and unesterified hydroxyl group.

Among the alpha-phase crystal-tending emulsifiers which can be used in the practice of this invention are the following classes of materials:

(a) A monoester of a straight chain aliphatic diol with a saturated fatty acid, said diol containing from 3 to 5 carbon atoms and said saturated fatty acid having from about 12 to about 22 carbon atoms, such as propylene glycol monostearate;

(b) A condensation product of a monohydroxy-monocarboxylic acid having from 2 to 6 carbon atoms with a partial fatty acid blyceride containing an average of from 1 to 2 fatty acid radicals having from about 12 to about 22 carbon atoms, such as monoglyceridyl lactate or lactostearin;

(c) A 1,3-diglyceride containing a saturated fatty acid having from about 16 to about 22 carbon atoms and a saturated fatty acid having from 2 to 4 carbon atoms, such as 1-acetyl-3-monostearin;

(d) A 1,2-diglyceride containing a saturated fatty acid having from about 16 to about 22 carbon atoms and a saturated fatty acid having from about 12 to about 18 carbon atoms, such as 1,2-distearin; and (e) A fatty acid monoester of diethylene glycol, said fatty acid having from about 12 to about 22 carbon atoms, such as diethylene glycol monostearate.

The following examples further illustrate this invention, but the invention is not limited to these specific examples; many other examples will become readily apparent to the person skilled in the art after reading this specification and the appended claims. All percentages and parts are by weight unless otherwise specified.

Example

As an example of the preparation of the additives of this invention, octadecyl phosphoryl dichloride was prepared in the absence of moisture according to the following procedure:

Ten grams of n-octadecanol (0.037 mole) was dissolved in 150 ml. pure chloroform. Then 8.3 grams of $POCl_3$ dissolved in 25 ml. pure chloroform was added dropwise to the octadecanol solution at a rate such that the reaction temperature was kept at about room temperature (about 70° F.). The reaction mixture was then stirred for two hours. The solvent was evaporated and 10.5 grams of octadecyl phosphoryl dichloride was recovered as a dark brown liquid product. The product was stored under moisture-free conditions until used as follows:

A fluid shortening was prepared by uniformly mixing together the following components in the stated amounts:

| Components: | Parts by wt. |
|---|---|
| Refined, bleached and deodorized liquid cottonseed oil | 85 |
| Propylene glycol stearate (approximately ½ each mono- and diesters) | 14 |
| Octadecyl phosphoryl dichloride (as prepared above) | 1 |

This shortening is useful for the preparation of bakery products such as cakes, breads, pastry doughs, sweet breads, and the like products made from emulsions comprising water, fats, proteins and/or carbohydrates. The octadecyl phosphoryl dichloride preferably is used for these purposes in the above and similar shortenings in levels of from about 0.1% to about 4.0% by weight. For such purposes, the shortening can be plastic, liquid or semi-fluid, as desired.

The above shortening was used in a cake mix consisting of a mixture of the following ingredients:

| Ingredients: | Parts by wt., grams |
|---|---|
| Cake flour | 107.0 |
| Granulated sugar (sucrose) | 133.0 |
| Salt (NaCl) | 2.5 |
| Double-acting baking powder | 6.8 |
| Shortening (as defined above) | 47.5 |
| Flavor | 2.5 |
| Whole milk | 130.0 |
| Fresh egg whites | 60.0 |

A cake batter was prepared by mixing together the above cake ingredients with a Sunbeam table model electric mixer at 500 r.p.m. for a total of 4 minutes. Four hundred grams of batter were then placed in an 8-inch cake pan and baked in an oven at 365° F. for about 25 minutes. The procedure was repeated twice using 0.5% and 2.0%, respectively, of the octadecyl phosphoryl dichloride in the shortening component, instead of 1%, and then another time for comparative purposes (control sample) without the octadecyl phosphoryl dichloride. The following table records the batter densities (grams per milliliter) of these samples after mixing and the cake volumes (cubic centimeters per 400 grams) immediately after removal from the oven (hot volume) and 20 minutes thereafter (cold volume).

| Weight Percent Octadecyl Phosphoryl Dichloride (Shortening Basis) | Batter density (g./ml.) | Cake volume (cc./400 g.) | |
|---|---|---|---|
| | | Hot | Cold |
| 0 (control) | 0.76 | 985 | 930 |
| 0.5 | 0.58 | 1,480 | 1,405 |
| 1.0 | 0.58 | 1,805 | 1,735 |
| 2.0 | 0.55 | 1,885 | 1,815 |

The reduction in batter density by the use of the octadecyl phosphoryl dichloride illustrates improvements in batter mixing such as more rapid mixing and mixing of all the ingredients in a single mixing step instead of the more usual creaming or blending methods. The increase in cake volume by the use of the octadecyl phosphoryl dichloride illustrates the improvements in air incorporation and foam stability. Similar improvements in batter density and cake volume are obtained when hexadecyl phosphoryl dibromide, hexadecyl phosphoryl dichloride, di-octadecyl phosphoryl chloride, di-octadecyl phosphoryl bromide, and octadecyl phosphoryl dibromide are substituted for the octadecyl phosphoryl dichloride in the above example. Similar improvements are also obtained when 4% octadecyl phosphoryl dichloride is employed in a base shortening consisting of 85 parts of soybean oil and 15 parts of cottonseed oil partially hydrogenated to an iodine value of about 75 and when this plastic shortening composition is substituted for the liquid shortening composition of the above example. Still other examples will be apparent to the person skilled in the art after reading this specification and the claims appended hereto. All such variations are included within the scope of this invention.

What is claimed is:

1. A liquid glyceride shortening composition containing as additives therein from about 0.5% to about 15%, by weight of the composition, of an alpha-phase crystal-tending emulsifier and from about 0.1% to about 4% by weight of the composition, of an alkyl phosphoryl halide selected from the group consisting of chloride and bromide containing from 1 to 2 alkyl groups having from about 12 to about 22 carbon atoms and from 1 to 2 halide atoms.

2. The composition of claim 1 in which the alpha-phase crystal-tending emulsifier is propylene glycol monostearate.

3. The composition of claim 1 in which the alkyl phosphoryl halide is octadecyl phosphoryl dichloride.

References Cited

UNITED STATES PATENTS 2,024,357  12/1935  Harris _____ 99—92
3,145,110  8/1964  Abbott _____ 99—92 X MAURICE W. GREENSTEIN, Primary Examiner U.S. Cl. X.R.
99—92